(12) United States Patent
Li et al.

(10) Patent No.: US 8,291,319 B2
(45) Date of Patent: Oct. 16, 2012

(54) INTELLIGENT SELF-ENABLED SOLUTION DISCOVERY

(75) Inventors: Huajing Li, State College, PA (US); Gopal Sarma Pingali, Mohegan Lake, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 12/549,644

(22) Filed: Aug. 28, 2009

(65) Prior Publication Data

US 2011/0055699 A1     Mar. 3, 2011

(51) Int. Cl.
*G06N 3/12* (2006.01)
*G06N 5/02* (2006.01)
*G06N 5/00* (2006.01)
*G06F 3/048* (2006.01)
*G06F 17/00* (2006.01)
*G06F 17/30* (2006.01)
*G10L 15/00* (2006.01)

(52) U.S. Cl. ............... 715/709; 704/9; 706/45; 706/52; 707/999.003; 707/999.004; 707/999.005

(58) Field of Classification Search .................. 715/709; 704/9; 706/45, 52; 707/999.003, 999.004, 707/999.005
See application file for complete search history.

(56) References Cited

U.S. PATENT DOCUMENTS

| | | | | |
|---|---|---|---|---|
| 5,600,835 A | * | 2/1997 | Garland et al. | 707/999.005 |
| 5,978,785 A | * | 11/1999 | Johnson et al. | 706/54 |
| 6,018,733 A | * | 1/2000 | Kirsch et al. | 1/1 |
| 6,020,886 A | * | 2/2000 | Jacober et al. | 715/709 |
| 6,138,085 A | * | 10/2000 | Richardson et al. | 704/1 |
| 6,259,445 B1 | * | 7/2001 | Hennum et al. | 715/709 |
| 6,542,889 B1 | * | 4/2003 | Aggarwal et al. | 707/999.001 |
| 6,658,598 B1 | * | 12/2003 | Sullivan | 714/25 |
| 7,051,017 B2 | * | 5/2006 | Marchisio | 707/713 |
| 7,146,359 B2 | * | 12/2006 | Castellanos | 1/1 |
| 7,318,226 B2 | | 1/2008 | Chefalas et al. | |
| 7,409,336 B2 | * | 8/2008 | Pak et al. | 704/9 |
| 7,558,778 B2 | * | 7/2009 | Carus et al. | 1/1 |
| 7,603,651 B2 | * | 10/2009 | De Brabander | 717/105 |
| 7,685,118 B2 | * | 3/2010 | Zhang | 706/55 |
| 7,865,829 B1 | * | 1/2011 | Goldfield et al. | 715/708 |

(Continued)

OTHER PUBLICATIONS

Misutka, et al., Mathematical Extension of Full Text Search Engine Indexer, Information and Communication Technologies: From Theory to Applications, 2008. ICTTA 2008. 3rd International Conference on, p. 1-6.*

(Continued)

*Primary Examiner* — Jordany Nunez
(74) *Attorney, Agent, or Firm* — Yee & Associates, P.C.; Louis J. Percello

(57) ABSTRACT

Solutions for solving a problem experienced by a user are retrieved. In response to receiving a query from the user describing the problem, relevant candidate solutions to the problem are sent to the user. In response to receiving a selection of one relevant candidate solution from the relevant candidate solutions, instructions steps within the one relevant candidate solution selected by the user are analyzed. An instruction step similarity is calculated between the instruction steps within the one relevant candidate solution selected and other instructions steps within other solutions stored in a storage device. Then, similar solutions are sent to the user containing similar instruction steps to the instruction steps contained within the one relevant candidate solution selected based on the calculated instruction step similarity.

20 Claims, 10 Drawing Sheets

U.S. PATENT DOCUMENTS

| | | | |
|---|---|---|---|
| 2002/0152190 A1* | 10/2002 | Biebesheimer et al. | 707/1 |
| 2003/0220890 A1* | 11/2003 | Okude | 706/50 |
| 2005/0038785 A1* | 2/2005 | Agrawal et al. | 707/6 |
| 2006/0053156 A1* | 3/2006 | Kaushansky et al. | 707/102 |
| 2006/0122994 A1* | 6/2006 | Kapur et al. | 707/4 |
| 2006/0184511 A1* | 8/2006 | Koo et al. | 707/3 |
| 2008/0154579 A1* | 6/2008 | Kummamuru | 704/9 |
| 2008/0189612 A1* | 8/2008 | Zhang et al. | 715/709 |
| 2008/0263404 A1* | 10/2008 | Vidiyala | 714/38 |
| 2010/0324927 A1* | 12/2010 | Tinsley | 705/2 |

OTHER PUBLICATIONS

Matsumura, et al.; Combination Retrieval for Creating Knowledge from Sparse Document Collection; Jan. 1, 2000; Lecture Notes in Computer Science (1611-3349) . vol. 1967.*

Gaaloul et al., "Research Challenges and Opportunities in Web Services Mining", pp. 1-16, INFORSID, 2006.

Liang et al., "Service pattern Discovery of Web Service Mining in Web Service Registry-Repository", Proceedings of the IEEE International Conference on e-Business Engineering, 2006, pp. 286-293.

Kummamuru et al., "Unsupervised Segmentation of Conversational Transcripts", SIAM, 2008, pp. 834-845 http://www.siam.org/proceedings/datamining/2008/dm08_75_kummamuru.pdf.

Mishne et al., "Automatic Analysis of Call-center Conversations", Proceedings of the 14th ACM International conference on Information and Knowledge Management, Bremen, Germany, 2005, pp. 453-459.

Padmanabhan et al., "Mining conversational text for procedures with applications in contact centers", International Journal on Document Analysis and recognition, vol. 10, Issue 3, Dec. 2007, pp. 227-238.

Takeuchi et al., A Conversation-Mining System for Gathering Insights to Improve Agent Productivity, E-Commerce Technology and the 4th IEEE International Conference on Computing, E-Commerce and E-services, 2007, CEC/EEE 2007, pp. 465-468.

Blei et al., "Latent Dirichlet Allocation", Journal of Machine Learning Research 3 (2003), pp. 993-1022.

Callan et al., "The INQUERY Retrieval System", Proceedings of the DEXA-92, 3rd International Conference on Database and Expert Systems Applications, 1992, pp. 78-83.

Carmel et al., "eResponder: Electronic Question Responder", CoopIS 2000, Proceedings of the 7th International Conference on Cooperative Information Systems, pp. 150-161.

Dietz et al., "Utilize Probabilistic Topic Models to Enrich Knowledge Bases", Proceedings of the ESWC 2006 Workshop on Mastering the Gap: From Information Extraction to Semantic Representation, Jun. 2006, pp. 1-20.

Gruber et al., "Hidden Topic Markov Models", Artificial Intelligence and Statistics (AISTATS), San Juan Puerto Rico, Mar. 2007, pp. 1-8.

Hofmann, "Probabilistic Latent Semantic analysis", Proceedings of Uncertainty in Artificial Intelligence, UAI'99, Stockholm 1999.

Keller et al., "Theme Topic Mixture Model: a Graphical Model for Document Representation" PASCAL Workshop on Learning Methods for Text Understanding and Mining, 2004 pp. 1-13.

Nambiar et al., "CallAssist: Helping Call Center Agents in Preference Elicitation", VLDB pp. 1338-1341, ACM 2007.

Small et al., "HITIQA: An Interactive Question Answering System a Preliminary Report", Proceedings of the ACL 2003 Workshop on Multilingual Summarization and Question Answering, pp. 46-53, Morristown NJ, 2003, Association for Computational Linguistics.

Zadeh, "From Search Engines to Question Answering Systems—The Problems of World Knowledge, Relevance, Deduction and Precisiation". In D. Zhang et al. Editors, IRI. IEEE Systems, Man, and Cybernetics Society, 2005.

* cited by examiner

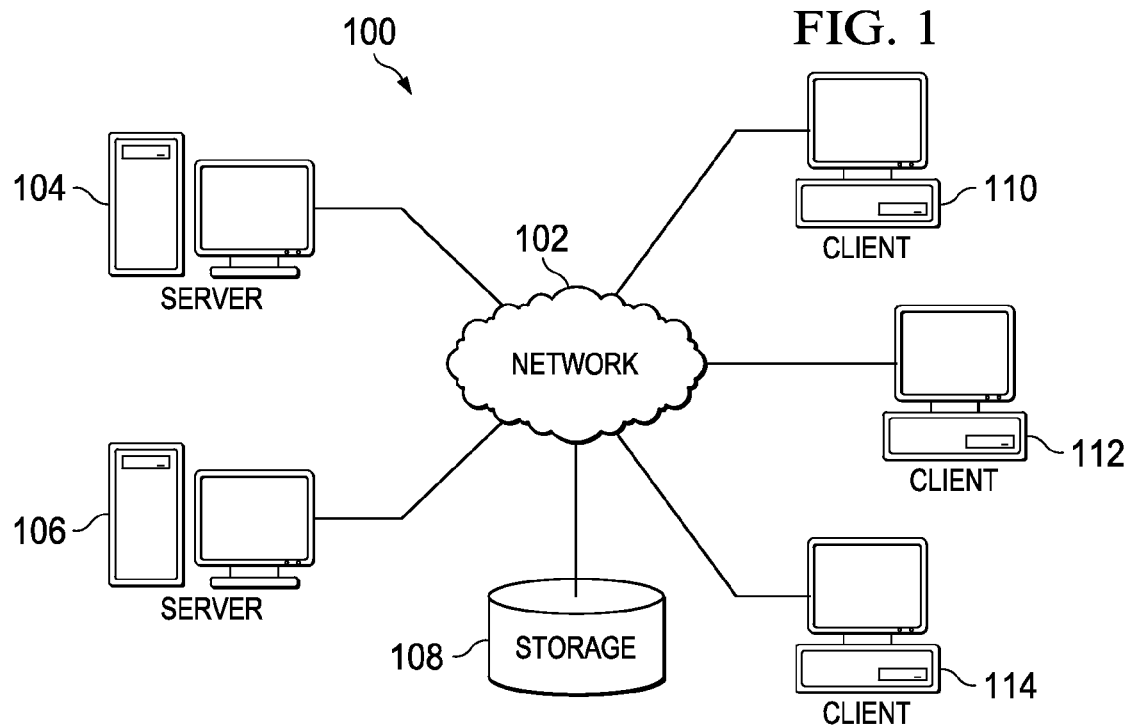

Algorithm for scoring the similarity of two execution paths.

802 — Input: $L_1, L_2$: two lists of click-through sequences.
804 — $r$: a threshold in filtering irrelevant steps
806 — Output: a score indicating the similarity between $L_1$ and $L_2$, $s$

```
pos = 0, s = 0.
for i = 0; i < L1.size; i + + do
    step s = L1.get(i).
    for j = pos; j < L2.size; j + + do
        step t = L2.get(j).
        if sim(s.noun, t.noun) > r then
            pos = j.
            s+ = sim(s.noun, t.noun).
            break.
        end if
    end for
end for
s/ = L1.size.
return s.
```

800
SCORING
ALGORITHM

INTELLIGENT SELF-ENABLED SOLUTION DISCOVERY

BACKGROUND

1. Field

The disclosure relates generally to an improved data processing system and more specifically to a computer implemented method, apparatus, and computer usable program code for automatically discovering solution procedures for customized problem resolution.

2. Description of the Related Art

Today, companies are increasingly moving their customer support services toward customer self-enablement. This customer self-enablement empowers the customers with on-line tools to reduce customer service center call volume and thus lower operating costs. In this self-enablement process, companies are opening up portions of their knowledge bases (i.e. databases containing well-structured text documents describing solution procedures and best practices to the most common problems or information technology (IT) issues experienced by customers), making these knowledge bases accessible to customers. In addition, such self-service solutions also provide access to software patches, updates, and other executables that aid customers in the problem resolution process.

At the same time, a proliferation of social technologies, such as social software, enable knowledge sharing by a community of customers and other users. Such collaborative support models are gaining favor with customers due to their potential to improve and speed-up problem resolution times, as well as faster access to different support solutions. Today, enormous amounts of data content, such as blogs, forums, online message boards, online guides, and Wikis, is becoming abundant and easily accessible on the Web due to the fast growing storage and processing capabilities of modern computers, which are ubiquitously connected. This heterogeneous Web content, if properly integrated, may provide a great source of information to provide solutions to many problems experienced by customers. Even though today's search engines are efficient in retrieving available online information, these search engines lack the ability to deduce and compose answers to queries by drawing on these bodies of information, which reside in various parts of knowledge bases and data sources.

SUMMARY

According to one embodiment of the present invention, solutions for solving a problem experienced by a user are retrieved. In response to receiving a query from the user describing the problem, relevant candidate solutions to the problem are sent to the user. In response to receiving a selection of one relevant candidate solution from the relevant candidate solutions, instructions steps within the one relevant candidate solution selected by the user are analyzed. An instruction step similarity is calculated between the instruction steps within the one relevant candidate solution selected and other instructions steps within other solutions stored in a storage device. Then, similar solutions are sent to the user containing similar instruction steps to the instruction steps contained within the one relevant candidate solution selected based on the calculated instruction step similarity.

BRIEF DESCRIPTION OF THE SEVERAL VIEWS OF THE DRAWINGS

FIG. 1 is a pictorial representation of a network of data processing systems in which illustrative embodiments may be implemented;

FIG. 8 is an exemplary illustration of a scoring algorithm in accordance with an illustrative embodiment;

DETAILED DESCRIPTION

Figure 2:
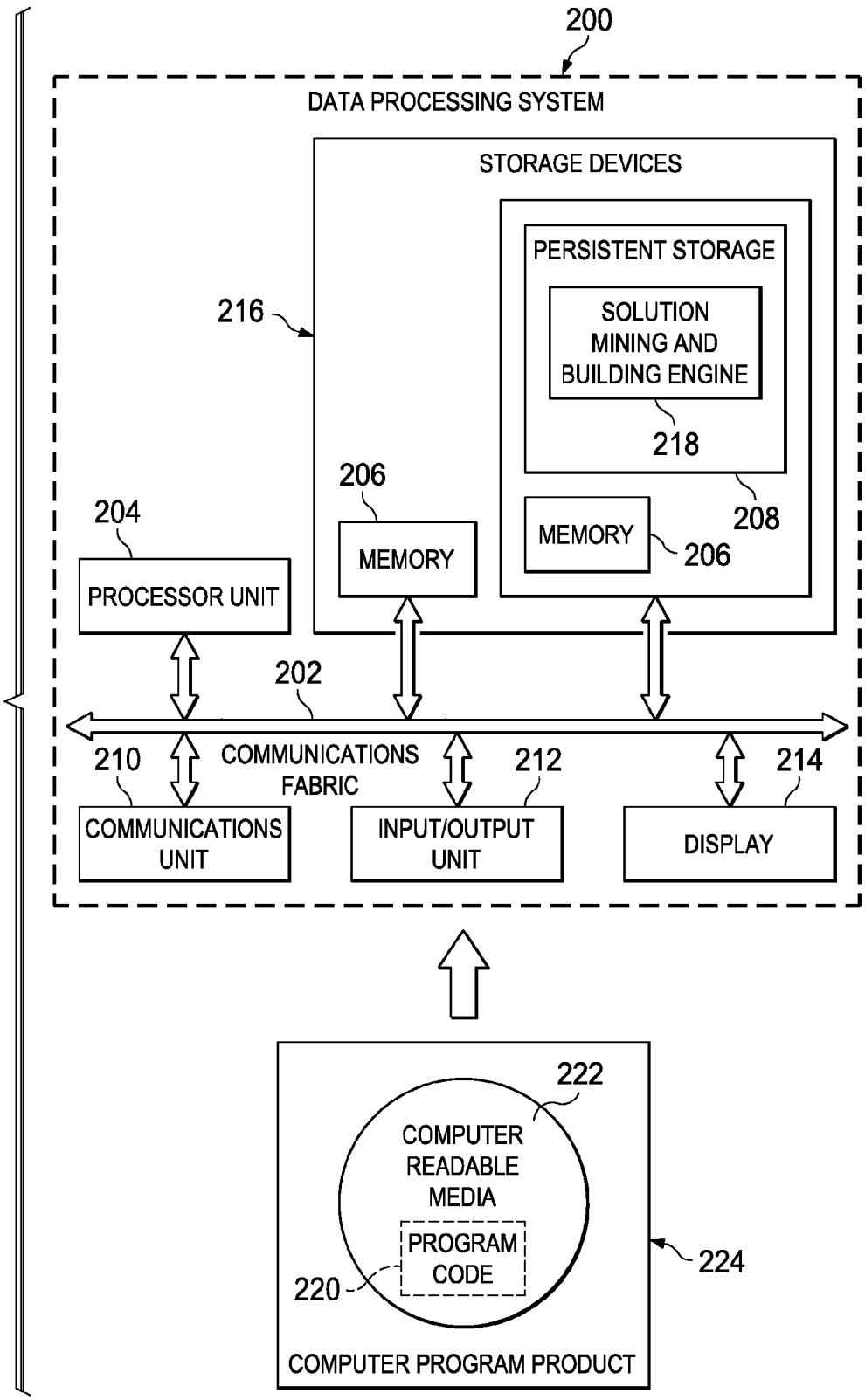
FIG. 2 is a diagram of a data processing system in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices, to produce a computer implemented process such that the instructions which execute on the computer or other programmable apparatus provide processes for implementing the functions/acts specified in the flowchart and/or block diagram block or blocks.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102, along with storage unit 108. Storage unit 108 is a network storage device capable of storing data in a structured or unstructured format. Further, storage unit 108 may represent a plurality of storage units connected to network 102.

Storage unit 108 may, for example, store data relating to descriptions of different IT problems experienced by customers of one or more businesses and other users. In addition, storage unit 108 may store data relating to procedures to resolve problems experienced by the customers in a structured format, such as formal documents produced by businesses. Further, storage unit 108 may store other data relating to procedures to resolve problems in an unstructured format, such as, web logs (blogs), forums, online message boards, online guides, and Wikis produced by social network dialogs among customers and other users. A social network is a community of customers or users, which are connected together by one or more computer networks, bound by a common interest, such as an interest in solving an IT issue or problem. Furthermore, storage unit 108 may store user identification data, user log in data, and user profile data for a plurality of users or customers seeking solutions to problems.

Clients 110, 112, and 114 also connect to network 102. Clients 110, 112, and 114 may, for example, be personal computers or network computers. In the depicted example, server 104 provides information, such as boot files, operating system images, and applications to clients 110, 112, and 114. Clients 110, 112, and 114 are clients to server 104 and/or server 106 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may, for example, be a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Persistent storage 208 includes solution mining and building engine 218. Solution mining and building engine 218 is a computer program, which includes a plurality of components, that automatically searches data repositories for known solutions to problems, such as IT issues. In addition, solution mining and building engine 218 automatically builds or constructs customized solution procedures for newly encountered problems from a plurality of previously stored solutions. In other words, solution mining and building engine 218 is an intelligent program that learns over time from, for example, users' previous solution selections for specific problems and other data, such as the relevance of these problems to specific topics located in a taxonomy.

Communications unit 210, in these examples, provides for communications with other data processing systems or devices. In these examples, communications unit 210 is a network interface card. Communications unit 210 may provide communications through the use of either or both physical and wireless communication links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples the instructions are in a functional form on persistent storage 208. These instructions may be loaded into memory 206 for implementation by processor unit 204. The processes of the different embodiments may be performed by processor unit 204 using computer implemented instructions, which may be located in a memory, such as memory 206.

These instructions are referred to as program code, computer-usable program code, or computer-readable program code that may be read and performed by a processor in processor unit 204. The program code in the different embodiments may be embodied on different physical or tangible computer readable media, such as memory 206 or persistent storage 208.

Program code 220 is located in a functional form on computer readable media 222 that is selectively removable and may be loaded onto or transferred to data processing system 200 for implementation by processor unit 204. Program code 220 and computer readable media 222 form computer program product 224 in these examples. In one example, computer readable media 222 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 222 also may take the form of a persistent storage, such as a hard drive, a thumb drive, or a flash memory that is connected to data processing system 200. The tangible form of computer readable media 222 is also referred to as computer recordable storage media. In some instances, computer readable media 222 may not be removable.

Alternatively, program code 220 may be transferred to data processing system 200 from computer readable media 222 through a communications link to communications unit 210 and/or through a connection to input/output unit 212. The communications link and/or the connection may be physical or wireless in the illustrative examples. The computer readable media also may take the form of non-tangible media, such as communication links or wireless transmissions containing the program code.

In some illustrative embodiments, program code 220 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 220 may be a server computer, a client computer, or some other device capable of storing and transmitting program code 220.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 222 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may, for example, be memory 206 or a cache such as found in an interface and memory controller hub that may be present in communications fabric 202.

Illustrative embodiments provide a computer implemented method, apparatus, and computer usable program code for automatically discovering solution procedures for customized problem resolution. Illustrative embodiments analyze content available on the Web, such as formal solution documents and informal socially shared solutions included in, for example, an instant messaging chat session, to determine which problems this available solution content may solve so that different parts of these solution documents or socially shared solutions may be effectively found and reused in the context of solving other people's problems. Furthermore, illustrative embodiments may reuse formal solution documents in knowledge bases, scripts and executable services, and embed procedures for solving basic problems to generate new solutions to new and more complex problems. Illustrative embodiments draw from two solution content areas. The first solution content area being the mining of executable services found on the Web and the second solution content area being the mining and reusing of knowledge found in formal solution documents or other online repositories. Thus, illustrative embodiments provide a comprehensive approach to the extraction, management, and sharing of solution procedures to resolve problems, such as IT issues.

Illustrative embodiments focus on the structural analysis of executable service interfaces, as well as metadata associated with formal solution documents, within the scope of the immediate social network of the current end-user, to infer possible solutions to problems. Illustrative embodiments evaluate the executable services available in end-users' social networks and their applicability to particular problem definitions. Illustrative embodiments are concerned with the discovery of business goals/objectives, or in the context of IT support, specific problem definitions (i.e., user query requests for solutions to problems), which may be satisfied by the available solution documents and executable services across community-shared data repositories. In addition, illustrative embodiments do not rely on predefined "templates" of executable service patterns or solution document procedures.

Illustrative embodiments provide an integrated problem resolution service that is based on federated knowledge bases containing solution support for identified problems. Illustrative embodiments are not limited to informal conversational solution data sources, such as online message boards, but also consider other various document sources, such as the Web, OCR documents, as well as the conversational data. Finally, illustrative embodiments reuse existing solutions to provide support for unknown problems by iteratively extracting relevant solution procedures and updating problem definitions.

Illustrative embodiments perform mining of formal and informal solution data and executable services available in the community-shared repositories of solution support procedures to detect atomic executable solution procedures, which may be applied to a particular problem definition. Structured solution documents may expose their content using metadata. Similarly, executable services may expose their functionality using semantically-enriched descriptions and interfaces.

A "solutionlet" is an atomic unit of solution data or executable solution service, which may be applied by an end-user to resolve all or part of the end-user's (IT) issue. By using data and service mining techniques, illustrative embodiments categorize the solutionlets based on the type of problems the solutionlets can aid the end-user to solve. By analyzing the effects of each solution and executable service, based on an assigned category, illustrative embodiments may further refine and infer specific problem definitions. The result is a list of problems, which may be successfully solved by the information and service resources available in the user's social network.

Illustrative embodiments provide the following functionality: 1) a taxonomy-based knowledge acquisition process, which handles highly heterogeneous textual data on the Web, that may identify solution steps and perform keyword extraction. Different from traditional textual-similarity based approaches, illustrative embodiments use a hybrid query mechanism that considers both textual relevance and topical relevance to overcome ambiguity of user queries; 2) an open knowledge mining framework, which may be leveraged by support services to provide self-enablement portals; 3) an open service mining framework, which may be leveraged by support services to provide self-enablement portals and implementation thereof; 4) a solution building process, which relies on an abstract solution implementation graph representation, is initialized to suggest hybrid solutions; and 5) a problem inference method for detecting a set of problem definitions that the solutionlets are applicable to.

Figure 3:
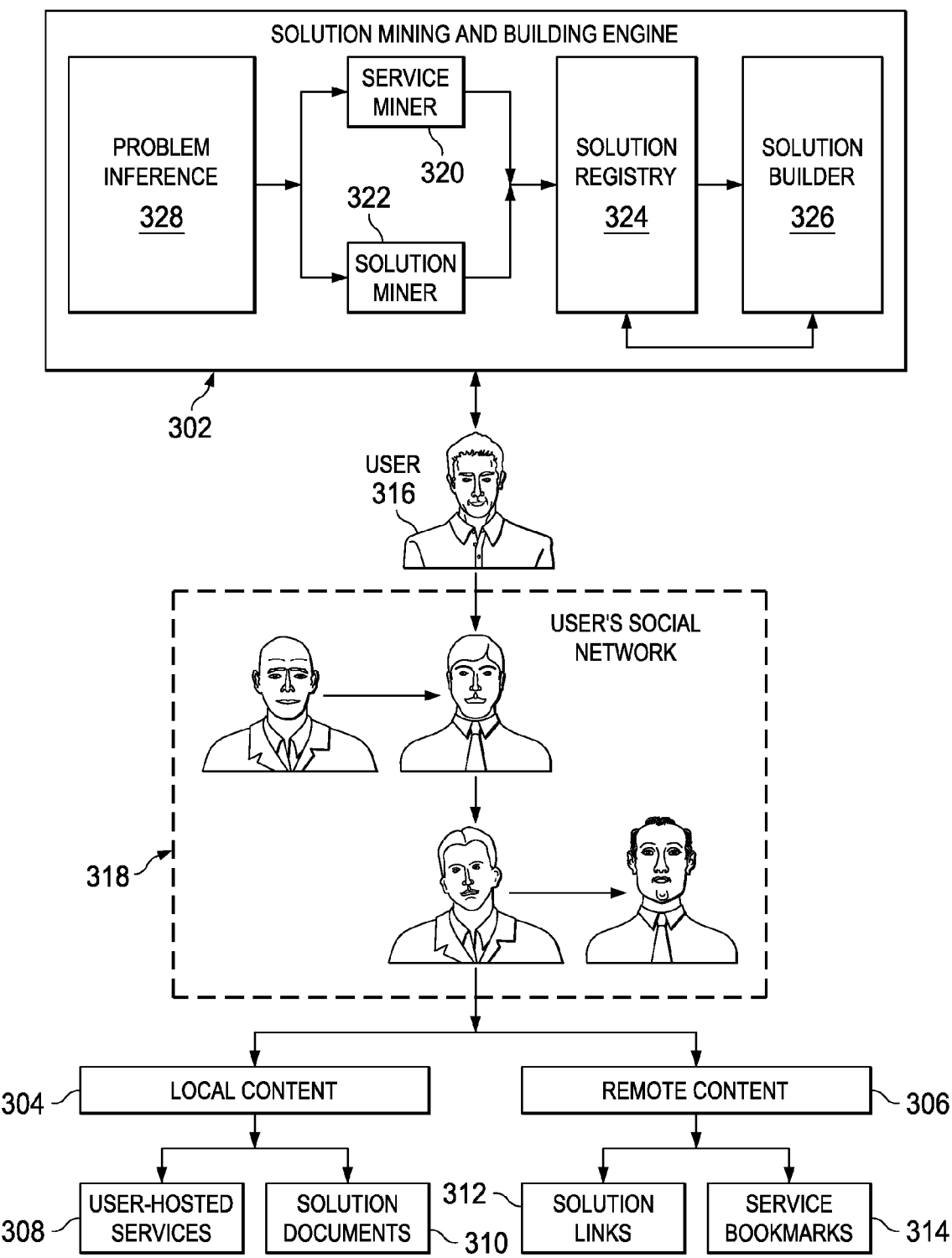
FIG. 3 is an exemplary illustration of a solution discovery system in accordance with an illustrative embodiment.

With reference now to FIG. 3, an exemplary illustration of a solution discovery system is depicted in accordance with an illustrative embodiment. Solution discovery system 300 may be implemented in a network of data processing systems, such as network data processing system 100 in FIG. 1. Solution discovery system 300 is a system for finding and recommending solutions to problems, such as IT problems, in response to receiving a query describing a specific problem experienced by a user, such as user 316.

Solution discovery system 300 includes solution mining and building engine 302, local content 304, and remote content 306. Solution mining and building engine 302 may, for example, be solution mining and building engine 218 in FIG. 2. Solution mining and building engine 302 automatically searches databases or data repositories, such as local content 304 and remote content 306, for stored solutions for resolving problems identified by user 316. In addition, solution mining and building engine 302 automatically builds customized solution procedures from instruction steps contained in a plurality of stored solutions for new problems.

Solution mining and building engine 302 considers two types of data content as a solution source. One type of solution data content is executable services. Another type of solution data content is solution documents, which may be in any kind of formal or informal online format or structure. Furthermore, solution mining and building engine 302 differentiates between locally and remotely available solution data content, such as local content 304 and remote content 306. Local content 304 is solution data content available within a local data repository in a data processing system, such as persistent storage 208 in data processing system 200 in FIG. 2. Remote content 306 is solution data content available within a remote data repository via a network, such as storage 108 coupled to network 102 in FIG. 1.

Again, the solution data content may either be an executable service or a problem solution in a formal or informal online document structure. Local content 304 includes user-hosted services 308 and solution documents 310. In addition, remote content includes solution links 312 and service bookmarks 314. Further, local content 304 and remote content 306 may be coupled to user's social network 318. User's social network 318 is a community of users coupled by a network that share a common interest with user 316 in finding a solution to a problem.

Solution mining and building engine 302 includes five main components: service miner 320, solution miner 322, solution registry 324, solution builder 326, and problem inference 328. Service miner 320 is the component that searches for available executable services, such as software patches, which may be used to solve specific IT problems. Solution miner 322 is the component that searches for available formal and informal textual solution content that may be used to solve specific IT problems. In addition, solution miner 322 extracts solution procedure steps contained in a solution document by applying a text analysis methodology to the data source. Further, service miner 320 and solution miner 322 analyze queries received from user 316 that describe an IT problem.

Solution registry 324 is the component that tracks the extracted solution procedure steps. In addition, solution registry 324 correlates the extracted solution procedure steps with corresponding executable services. Solution builder 326 is the component that iteratively builds a solution (i.e., solutionlet), as the user query is refined during the problem resolution process. Problem inference 328 is the component that "reverse engineers" solutionlets to identify which problems the solutionlets are suitable for solving.

Solution discovery system 300 performs text analytics on the solution data sources available in user's social network 318 to extract relevant solution procedure steps solving the user 316's IT problem. Solution discovery system 300 improves the quality of online IT support systems, as well as other query answering systems, which are based on specific knowledge domains. Solution discovery system 300 achieves two goals: 1) improves the precision of solution services by utilizing domain knowledge bases, such as online archives and user histories; and 2) in the case of user query ambiguity, solution discovery system 300 provides an interactive environment that allows technical service agents to collaborate with users to solve the IT problem.

The data structure of the solution documents, which answer previously received user queries that include a description of an IT problem, are manually created by technical support agents. All these documents form a solution knowledge base for software solutions. Each piece of solution data in the solution knowledge base is a well-formed HTML document that includes the following attribute fields: 1) a product attribute field, which includes the name of the target product, such as, for example, Excel 2003 or Lotus Notes; 2) an action attribute field, which is a course-grained categorization of problems, such as, for example, an interface problem or a security problem; 3) a title attribute field, which is a detailed explanation of the problem solved by this solution; and 4) an instruction attribute field, which is a list of instruction steps for users to solve the problem.

Each solution document contains information regarding technical details of a solution to a problem and relevant semantics. Solution mining and building engine 302 utilizes the metadata of solution documents to improve performance. Also, in order to incorporate external resources into the existing solution knowledge base, solution mining and building engine 302 transforms the heterogeneous online texts into the given structure of a solution found in the solution knowledge base (i.e., solution registry 324).

To improve the completeness of the solution knowledge base, solution mining and building engine 302 locates relevant solution documents on the Web and adds these documents into the solution knowledge base. The solution crawlers of solution mining and building engine 302 work in two different modes: 1) a product mode; and 2) a ticket mode. In the product mode, solution mining and building engine 302 tries to find solution documents for a specific product, such as a new version of a software product. However, the ticket mode is only driven by the description of the problem. After receiving a user ticket that describes a specific problem, solution mining and building engine 302 initializes a process to use the user-supplied ticket text as a query to find relevant online solution documents.

To add new solutions to the existing solution knowledge base collection, solution mining and building engine 302 uses two critical steps: 1) identify solution documents; and 2) transform the solution documents into the format of the existing solution knowledge base collection. Due to the heterogeneous nature of online help websites, as well as the richness of problem types, it is unrealistic to apply a uniform rule-based template to all crawled documents. Using human labor to label solution documents requires extra effort in putting pieces of information together and guaranteeing the data quality. Consequently, solution mining and building engine 302 utilizes an autonomous learning process in the document filter to locate relevant solution documents and parse these documents into the solution format with the assistance of the domain knowledge extracted from the existing solution knowledge base.

Although each product may have its own unique problem genres, many problems are common across products and platforms. For example, security concerns are well found for most Web tools, such as email clients and Web browsers. Meanwhile, solutions usually contain keywords that are commonly used in giving instructions. By analyzing the existing knowledge base, solution mining and building engine 302 trains a solution document classifier, using the term vocabulary as the feature space. Different from traditional keyword-based or heuristics-based approaches, solution mining and building engine 302 does not simply take the classification results to determine solutions. Many solutions may exist among the documents returned by the solution document classifier.

Solution mining and building engine 302 uses a relevance measurement to locate a few possible solutions, which are used to generate a template for filtering documents. For each specific product, solution mining and building engine 302 determines and follows the template for its corresponding solution document. By analyzing a few good example solution documents, solution mining and building engine 302 obtains the template and applies the template to the whole crawled data set to filter irrelevant documents. The template is written into a set of rules, which can be divided into two groups of rules: 1) structural rules, which dictate the typical layout and organization of the solution documents; and 2) URL patterns, which are summarized from identified solutions. Solution mining and building engine 302 uses these URL patterns because technical support documents are usually organized under a specific path. However, it should be noted that URL patterns are optional rules as URL patterns may not be applicable in some cases or may not be very effective in classifying solution documents in other cases.

Moreover, solution mining and building engine 302 may use the template to extract necessary keywords for the solution structure. As noted above, popular problem symptom keywords and solution keywords are maintained in the solution knowledge base collection. By using the keywords to generate a site-specific solution template, solution mining and building engine 302 is able to identify possible source tags for the solution required attributes, such as actions and instructions. Solution mining and building engine 302 adds this auxiliary information into the template as tags for structural rules.

Solution mining and building engine 302 uses an extended version of an open source library, such as, for example, Hypertext Markup Language (HTML) Parser2, to parse the structure and text of the crawled HTML documents, whose results are sent to the process to infer a template for solutions. It should be noted that instructions returned by the template are given in free text format instead of the step-wise format required by the solution data. As a result, solution mining and building engine 302 uses a segmentation process to cut the free text into instruction steps.

Solution mining and building engine 302 may use two sources of information for the segmentation process. Many solution documents provide already-cut steps, represented within specific structural tags. Solution mining and building engine 302 uses these structural tags to segment the solutions into individual instruction steps. On the other hand, if no strictly-followed structural tags to represent steps exist in the free text, then solution mining and building engine 302 uses a natural language processing approach. Basically, solution mining and building engine 302 generates part-of-speech tags for each term in the instruction text block. By analyzing steps in solution documents, solution mining and building engine 302 decomposes each step into the following three parts: 1) the verb part, which is the action taken in the step; 2) the noun part, which is the target of the action; and 3) the preposition part, which is where and how this action is supposed to be carried out.

Thus, solution mining and building engine 302 takes the target text block as a stream of sentences and analyzes the sequence sequentially. Solution mining and building engine 302 matches the part-of-speech tags of words in each sentence to the current step and adds the part-of-speech tags into the current step once the verb, noun, and preposition parts are found. Solution mining and building engine 302 repeats this process until the current step is complete, indicating the finalization of a step. Solution mining and building engine 302 places a segmentation symbol at the end of the current sentence and initializes the current step plus one as an empty set. Solution mining and building engine 302 continues to collect steps until the end of the instruction block.

Typically, users do not necessarily have a decent understanding to their IT problems and the context of those problems. Thus, it is often observed that a certain degree of ambiguity exists in the textual queries issued from users. Traditional information retrieval systems are unable to deal with such queries due to their incapability in supporting context analysis and term disambiguation. Consequently, solution discovery system 300 leverages machine learning techniques to transform textual solution data, as well as user queries, into a domain-specific problem space, which works together with textual inverted indices to answer user queries. To be specific, solution mining and building engine 302 uses a hierarchical problem topic taxonomy.

Figure 4:
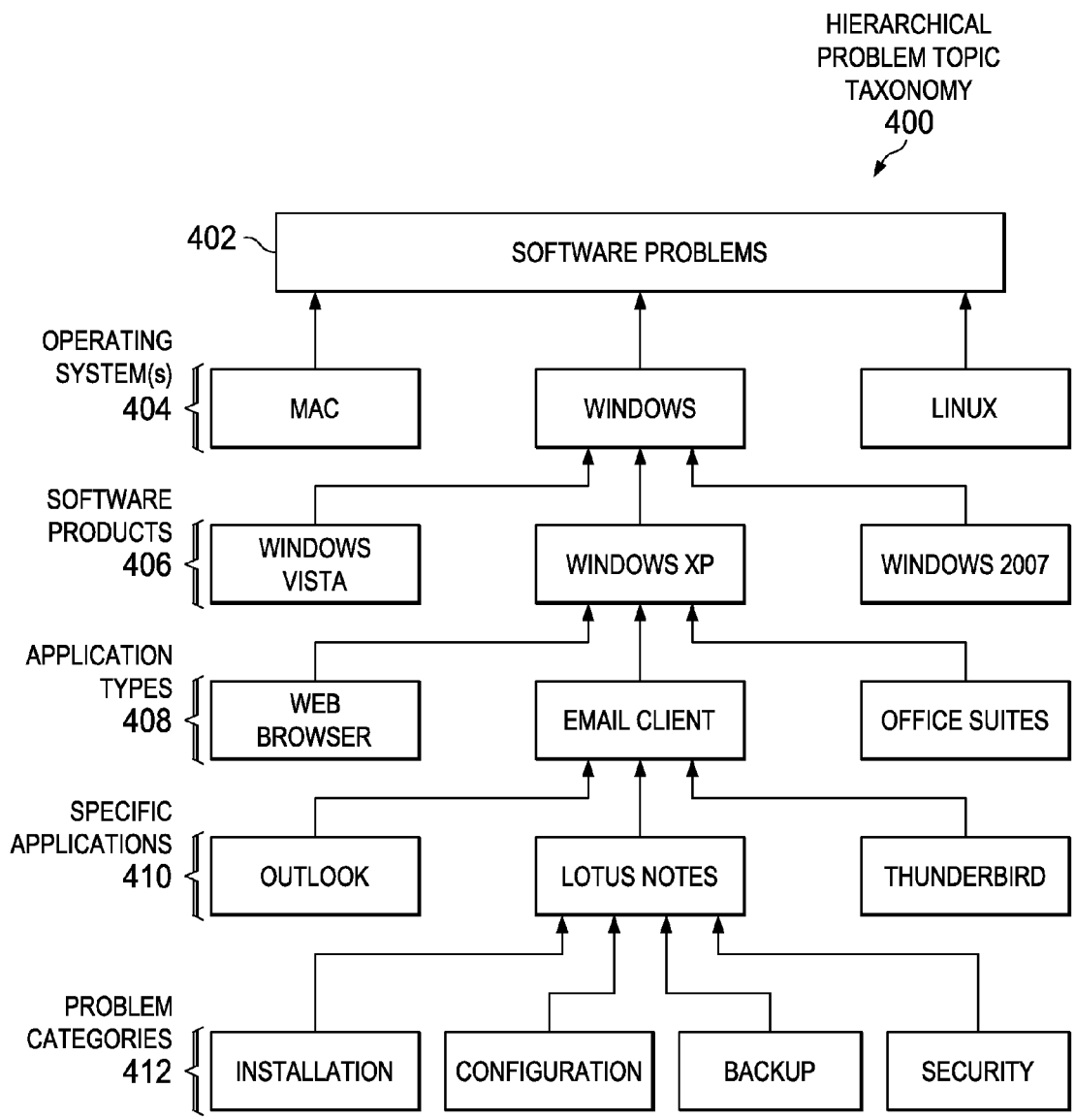
FIG. 4 is an exemplary illustration of a hierarchical problem topic taxonomy in accordance with an illustrative embodiment.

With reference now to FIG. 4, an exemplary illustration of a hierarchical problem topic taxonomy is depicted in accordance with an illustrative embodiment. Hierarchical problem topic taxonomy 400 may, for example, be implemented in a solution mining and building engine, such as solution mining and building engine 302 in FIG. 3. The solution mining and building engine uses hierarchical problem topic taxonomy 400, which is a multi-layered domain taxonomy, to describe software problems.

The default structure of a solution document contains metadata regarding the semantics and category of a target document. The default structure may be viewed as a two-layered hierarchy, with product as the super-class and action as the sub-class. The solution mining and building engine enriches this default two-layered hierarchy with more domain taxonomy layers. Because most solutions are used for software products, the solution mining and building engine utilizes a knowledge base regarding software developers and applications, which are added into the original two-layered hierarchy to make it a multi-layered hierarchy. The solution mining and building engine uses the multi-layered hierarchy during a ranking function. However, it should be noted that if a domain taxonomy does not exist or is not available, the solution mining and building engine employs a topic-model-based approach by transforming both user profiles and solution documents into a dimension-reduced feature space.

To add the topical relevance into a search process, the solution mining and building engine trains a multi-class classifier for documents that belong to each leaf node in the hierarchy based on the documents' term distributions. Once the solution mining and building engine receives a user query describing a problem, the query is first sent to the classifier to obtain its topical tags in the hierarchy. Here the solution mining and building engine uses a soft-classification approach, which allows each query to be related with multiple topics. Therefore, the query's topical tags in the hierarchy are a probabilistic distribution of the query over the product taxonomy. Then, solution mining and building engine uses the query's topical tags in the ranking process to find a topical relevance score for the topic of a solution candidate. For example, if a user sends a query to ask for solutions to problems associated with Windows® 2007, solutions for other versions of Windows® may have a higher topical relevance score in return.

Hierarchical problem topic taxonomy 400 includes software problems 402, which is the root node of the taxonomy. The first layer under root node software problems 402 is operating systems (OSs) 404. In this example, OSs 404 include a Mac OS®, a Windows® OS, and a Linux® OS. The second layer is software products 406, which are nodes under OSs 404. In this example, software products 406 include a Windows Vista® software product, a Windows® XP software product, and a Windows® 2007 software product, which are nodes under the Windows® OS node in the first level of the taxonomy. However, it should be noted that illustrative embodiments allow a software product to be registered under multiple operating systems as long as the software product provides multi-platform support.

The third layer in the taxonomy is application types 408, which identifies the general type of software applications that may be associated with software products 406. In this example, application types 408 include a Web browser application type, an e-mail client application type, and an office suites application type associated with the Windows® XP software product in the second level. The fourth layer is specific applications 410, which are specific applications for application types 408 in the third layer. In this example, specific applications 410 include an Outlook® e-mail client application, a Lotus Notes® e-mail client application, and a Thunderbird™ e-mail client application. The fifth layer is problem categories 412, which are categories of known IT problems. In this example, problem categories 412 include an installation category, a configuration category, a backup category, and a security category that are associated with the Lotus Notes® e-mail client application. However, it should be noted that problem categories 412 may include other problem categories as well. In addition, hierarchical problem topic taxonomy 400 may include more or fewer layers as needed by processes of illustrative embodiments.

The solution mining and building engine uses hierarchical problem topic taxonomy 400 to label solutions, as well as user queries, into specific problem topics. Then, the solution mining and building engine uses these problem topics to determine topic relevance for particular IT problems described in the user queries. Once the solution mining and building engine receives a user query describing a particular IT problem, the problem description is first sent to an analysis process to obtain its topical representation. This analysis process utilizes a domain-specific dictionary, as well as language models trained from labeled solution data. The topical representation of the user query is a probabilistic distribution of the query over the hierarchical problem topic taxonomy. Then, the topical representation of the user query is compared with a topic distribution of solutions to reveal their relevance. This solution discovery process is described in the description of FIG. 5.

Figure 5:
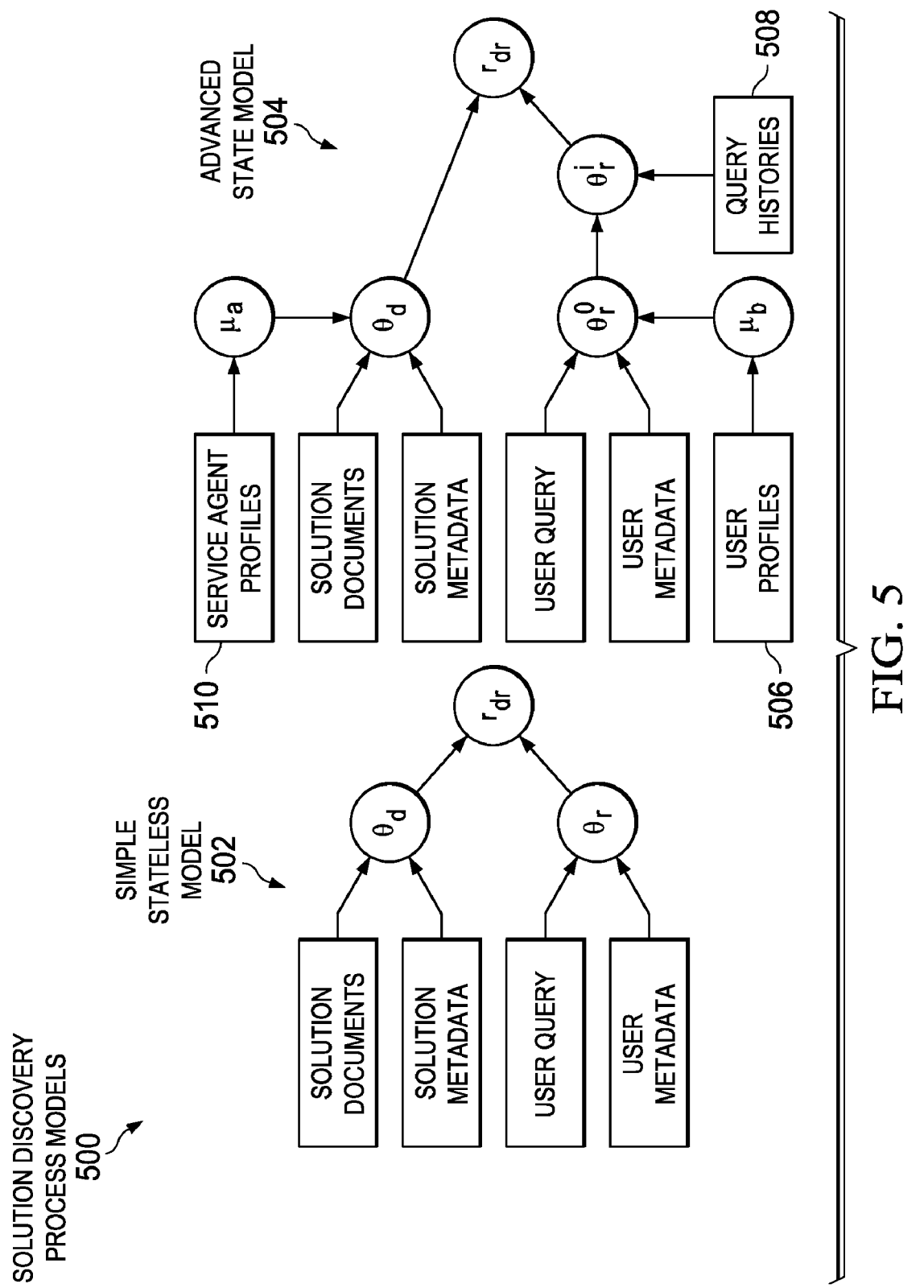
FIG. 5 is an exemplary illustration of solution discovery process models in accordance with an illustrative embodiment.

With reference now to FIG. 5, an exemplary illustration of solution discovery process models are depicted in accordance with an illustrative embodiment. Solution discovery process models 500 may, for example, be implemented in a solution mining and building engine, such as solution mining and building engine 302 in FIG. 3. Solution discovery process models 500 include simple stateless model 502 and advanced state model 504.

Simple stateless model 502 is a simple solution discovery model that only compares solution topics with user query topics to discover a problem solution. On the other hand, advanced state model 504 is a more sophisticated solution discovery model, which in addition to comparing solution topics with user query topics, also considers user profiles 506, user query histories 508, and technical service agent profiles 510 to determine the topic relevance for a solution and a query. By analyzing user profiles 506 and technical service agent profiles 510, advanced state model 504 is able to take into consideration the preferences of the users and the expertise of the technical service agents to discover problem solutions. In addition, by analyzing user query histories 508, advanced state model 504 is able to take into consideration previous user queries, which have an implicit impact on the current query topic because it has been observed that technical problems are often correlated for a specific user. By using advanced state model 504, the solution topic is no longer a deterministic one, but is also a probabilistic distribution over the hierarchical problem topic taxonomy.

The calculated topical relevance is combined with a textual similarity returned by inverted indices of the solution mining and building engine to generate a hybrid score for each relevant candidate solution. A parameter is introduced in the scoring formula to control the impact of topical relevance, which may be tuned according to the specific requirements and analysis of user profiles and query histories. The solution mining and building engine uses an open source full text index library, such as, for example, Lucene3, and develops a customized ranking class to replace the original text-based ranking class.

Figure 6:
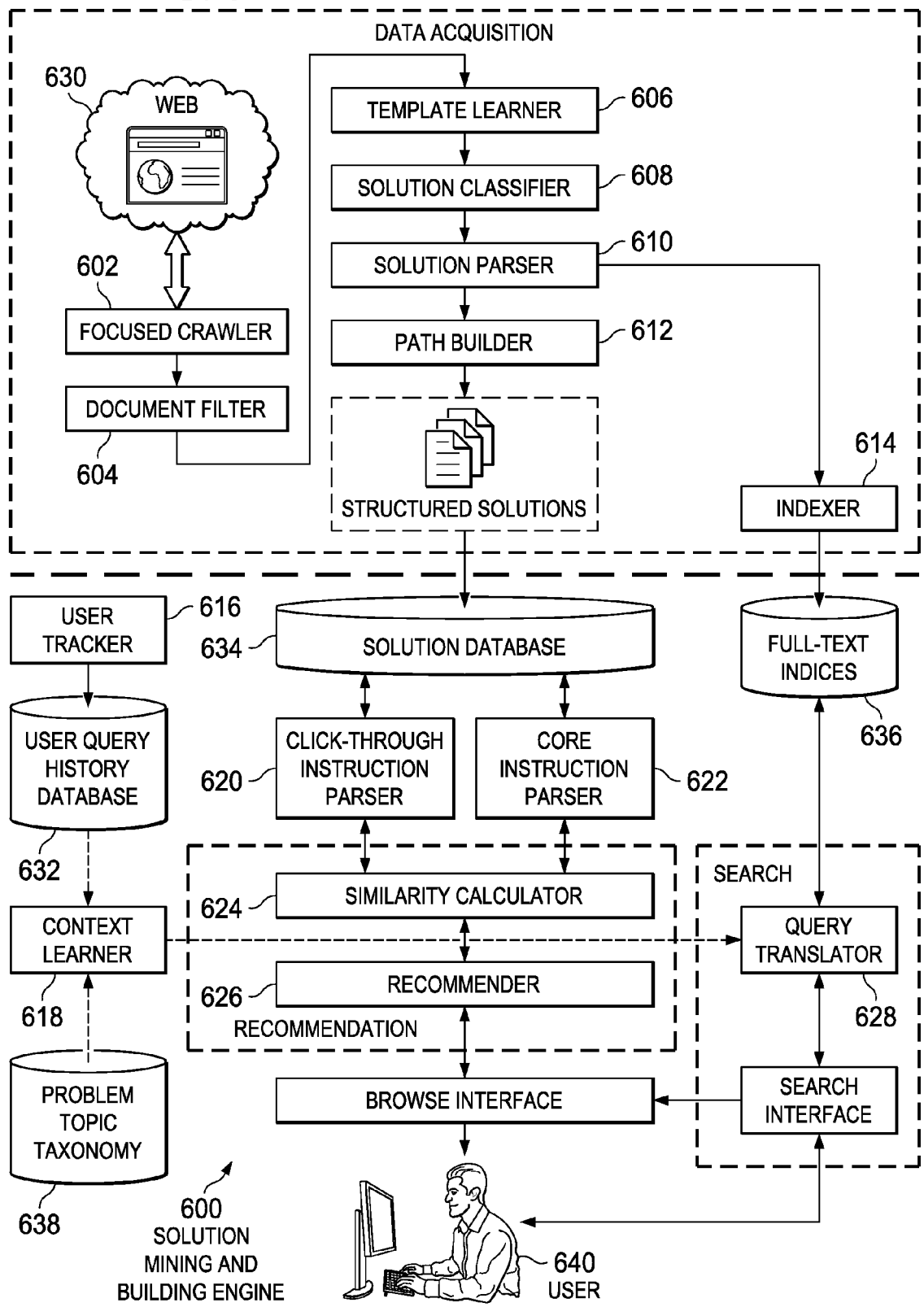
FIG. 6 is an exemplary illustration of components of a solution mining and building engine in accordance with an illustrative embodiment.

With reference now to FIG. 6, an exemplary illustration of components of a solution mining and building engine are depicted in accordance with an illustrative embodiment. Solution mining and building engine 600 may, for example, be implemented in network of data processing systems, such as network data processing system 100 in FIG. 1 or in a single data processing system, such as server 104 or client 110 in FIG. 1. In addition, solution mining and building engine 600 may, for example, be solution mining and building engine 302 in FIG. 3.

Solution mining and building engine 600 automatically searches a plurality of local and remote data repositories, such as local content 304 and remote content 306 in FIG. 3, for solutions to IT problems. In addition, solution mining and building engine 600 automatically builds customized solution procedures from a plurality of previously stored solutions. For example, solution mining and building engine 600 may select one or more instruction steps found in one solution document to combine with one or more other instruction steps found in a second solution document to generate a customized solution to a user's problem. Further, in response to receiving user input to reject one or more of the instruction steps included in the customized solution procedure, solution mining and building engine 600 may output a modified solution procedure with a second set of instruction steps based on the user's input.

Solution mining and building engine 600 includes focused crawler 602, document filter 604, template learner 606, solution classifier 608, solution parser 610, path builder 612, and indexer 614. Solution mining and building engine 600 utilizes these components to acquire or find solution data to identified IT problems. Solution mining and building engine 600 uses focused crawler 602 to crawl or search Web 630 for solution documents according to problem queries received from user 640. Web 630 may, for example, be network data processing system 100 in FIG. 1.

Solution mining and building engine 600 uses document filter 604 to filter out irrelevant documents from the solution document set retrieved from Web 630. Solution mining and building engine 600 uses template learner 606 to improve the accuracy of solution document detection. Most solution documents in a product support Web site follow a uniform structure or template. Template learner 606 tries to infer the template for the product support Web site via a voting strategy.

Based on the learned structure or template for the product support Web site, solution classifier 608 classifies the already-filtered solution documents into two different sets. One set is a set of solution documents and the other set is a set of non-solution documents. Solution mining and building engine 600 stores the set of solution documents in solution database 634, while discarding the set of non-solution documents. Solution database 634 stores all the solution documents.

Solution mining and building engine 600 uses solution parser 610 to parse necessary metadata from unstructured HTML solution documents, such as, for example, blogs or instant messaging chat sessions, found on Web 630. Solution mining and building engine 600 uses path builder 612 to translate each solution document into a solution path or a status-transition path to represent the metadata level composition of each solution document. Solution mining and building engine 600 uses indexer 614 to index solution documents into full-text indices 636. Full-text indices 636 are inverted indices used to answer full-text queries. Solution mining and building engine 600 stores each term observed in a solution document corpus as an entry in full-text indices 636. These raw textual data are analyzed offline to train a topic classifier on problem topic taxonomy 638, which is defined in solution mining and building engine 600. Problem topic taxonomy 638 may, for example, be hierarchical problem topic taxonomy 400 in FIG. 4. In this process of analyzing the raw textual data, solution mining and building engine 600 performs several steps, which includes text parsing, keyword tagging, and data labeling.

Solution mining and building engine 600 also includes user tracker 616, context learner 618, click-through instruction parser 620, core instruction parser 622, similarity calculator 624, recommender 626, and query translator 628. Solution mining and building engine 600 uses these components to recommend possible solutions for a particular problem identified in a query or to generate a customized solution for the particular problem from a plurality of solution documents. Solution mining and building engine 600 uses user tracker 616 to track user activities based on a generated user context for the problem. Solution mining and building engine 600 stores these user activities in user query history database 632. User query history database 632 stores a history of problem queries submitted by a plurality of users, as well as users' search and browse histories. In addition, user query history database 632 may also store user profile information, such as user name, user identification number, and user password, to uniquely identify users and to match users to respective user query histories.

Solution mining and building engine 600 uses context learner 618 to translate the collected history of user activities into a context space for searching purposes. Solution mining and building engine 600 uses click-through instruction parser 620 to analyze a solution's status-transition path or solution path to select instruction steps for only click-through purposes. Solution mining and building engine 600 uses core instruction parser 622 to analyze a solution's status-transition path or solution path to select instruction steps with only critical core functions.

Solution mining and building engine 600 uses similarity calculator 624 to measure the metadata level similarity between two solutions for recommendation purposes. Solution mining and building engine 600 uses recommender 626 to return highly relevant solution documents to users based on solution documents that users are browsing. Solution mining and building engine 600 uses query translator 628 to translate original problem queries received from users into an internal form, which includes terms from the original query, as well as the user contexts for the problems described in the queries.

When a query describing a problem arrives from user 640, solution mining and building engine 600 sends the query to a classifier to calculate the topical relevance of the query to stored solutions. Based on the calculated topical relevance of the query to stored solutions, solution mining and building engine 600 generates a set of relevant candidate solutions for solving the problem. A ranker, which utilizes both topical similarity and literal relevance, ranks the solutions in the set of relevant candidate solutions and sends the ranked candidate solutions to user 640 for review. When user 640 browses through the returned set of ranked candidate solutions, solution mining and building engine 600 collects and records the click-through activities of user 640 in the returned set of candidate solutions, as well as newly updated queries sent by user 640 regarding the problem, to update the query topic based on which newly ranked solutions are returned.

However, if user 640 fails to find a relevant solution in the set of returned candidate solutions or user 640 is not sure of the query text, user 640 may choose to select an interactive solution recommendation or solution building process. Solution mining and building engine 600 analyzes the internal structure of instructions for a solution to determine a solution path, which is the internal semantic organization of the solution. Solution mining and building engine 600 bases the recommendation process on the analyzed solution paths, which may be used for users to probe possible alternative solutions when the current solution does not work. In addition, solution mining and building engine 600 may infer missing solutions or build new solutions from a plurality of stored solutions based on an interactive process with user 640 during the recommendation process.

A solution instruction list is a sequence of instruction operations or instruction steps, each step providing a clear definition about what the step contributes to the solution. Each instruction step may be interpreted as a ternary tuple, which includes a noun phrase regarding an action target of the instruction step, a verb phrase regarding the action itself, and a prepositional phrase regarding the context of the action. By analyzing the internal sequence steps of instructions, each solution may be interpreted as a unidirectional sequence.

A solution usually starts with some steps of click-through instructions, such as, for example, "click the file menu", and then follows with several critical core instruction steps in the middle of the solution, which guides user 640 through the process of solving the problem. These instruction steps are then followed by another set of click-through steps to exit back to an initial solution interface. Also, several explanatory instruction steps may exist among the critical core instruction steps, which provide user 640 with some auxiliary information.

This solution sequence pattern is well captured in the solution knowledge base collection within solution database 634, as well as in crawled solution documents. In addition, the wording of each type of instruction step has strong unique characteristics, which are analyzed to reveal the nature of each instruction step. Solution mining and building engine 600 defines six unique instruction step types from these unique characteristics. The instruction step types are: 1) a start instruction step, which is a virtual step added to the beginning of each solution; 2) a click-through instruction step, which is one or more navigation steps that guide user 640 to the core instruction steps in a solution; 3) an action instruction step, which is one or more core instruction steps in a solution that actually change the settings or configurations of a software program; 4) an exit instruction step, which is one or more steps that mark the end of the core instruction steps; 5) an auxiliary instruction step, which is one or more explanatory instruction steps or other steps that are not included within the previous three instruction step types; and 6) an end instruction step, which is another virtual step added to the end of each solution.

Because each instruction step in a solution is labeled using the above six instruction step types, solution mining and building engine 600 can generate a solution path for each solution. If the auxiliary step is omitted from a solution instruction sequence, solution mining and building engine 600 may segment the entire instruction sequence into a set of sequential subgroups, each subgroup including some click-through instruction steps to the target location and some core action instruction steps, which are then followed by an exit instruction step. In addition, most solution documents contain only one such group in their instructions. For crawled pages of a solution document, some pages may contain more than one group because several solutions may exist on one page.

Another user, such as a system administrator, may manually label samples from the solution knowledge base collection within solution database 634, which are then used to train solution classifier 608 to capture the representative terminology of each instruction step type in a solution. Solution mining and building engine 600 analyzes all solutions using solution classifier 608 to reveal their respective solution paths. Further, solution mining and building engine 600 may highlight the critical core instruction steps, which are the action steps of each solution, so that user 640 may more easily recognize the intention and goal of each solution. Furthermore, solution mining and building engine 600 utilizes the segmented solution paths for the recommendation process.

Based on the segmented solution paths, solution mining and building engine 600 may provide intelligent self-enabled solution recommendations based on the similarity between like click-through instruction steps, as well as like critical core instruction steps, of different solutions stored in solution database 634. For each solution, solution mining and building engine 600 may link the noun phrases of each click-through instruction step in order to determine the path to reach the critical core instruction steps. Solution mining and building engine 600 indexes the linked click-through instruction sequence so that when user 640 browses a particular solution, user 640 can know what other correlated solutions are available with the same or similar click-through instruction sequences.

This approach is very useful in enriching the solution knowledge base data collection by leveraging existing solutions to build or construct new solutions. For example, suppose user 640 wants to solve a printer setting problem for Excel 2007 and the solution for this particular problem is missing in the solution knowledge base collection within solution database 634. User 640, by querying solution mining and building engine 600, may still receive one or more printer setting solutions for Excel 2007 even though the solution for this particular problem does not exist in the solution knowledge base collection.

Solution mining and building engine 600, by analyzing solutions with similar instruction implementation paths, may recommend one or more printer setting solutions for earlier versions of Excel due to similarity of instruction implementation paths. In response to user 640 acknowledging that this solution solves this particular printer setting problem for Excel 2007, solution mining and building engine 600 adds this solution to the solution knowledge base collection for future use. Moreover, after determining the current solution user 640 is browsing, solution mining and building engine 600 may utilize the textual relevance of the parsed ternary tuple of the core instruction steps of this currently browsed solution to recommend other solutions, which are believed to solve a cross-product common problem.

Once a user initializes a solution discovery process, the system first identifies a set of candidate relevant solutions, whose implementation paths are compared and mixed. This mixed solution graph is used to generate simple yet insightful questions and these questions are sent to user 640, whose answers are used to filter the probe scope to generate a personalized solution. If the solution cannot perfectly solve the problem at issue, the solution may be used as a draft in, for example, a Wiki page, which is then presented to a technical service agent that will collaborate with user 640 to solve the problem.

Figure 7:
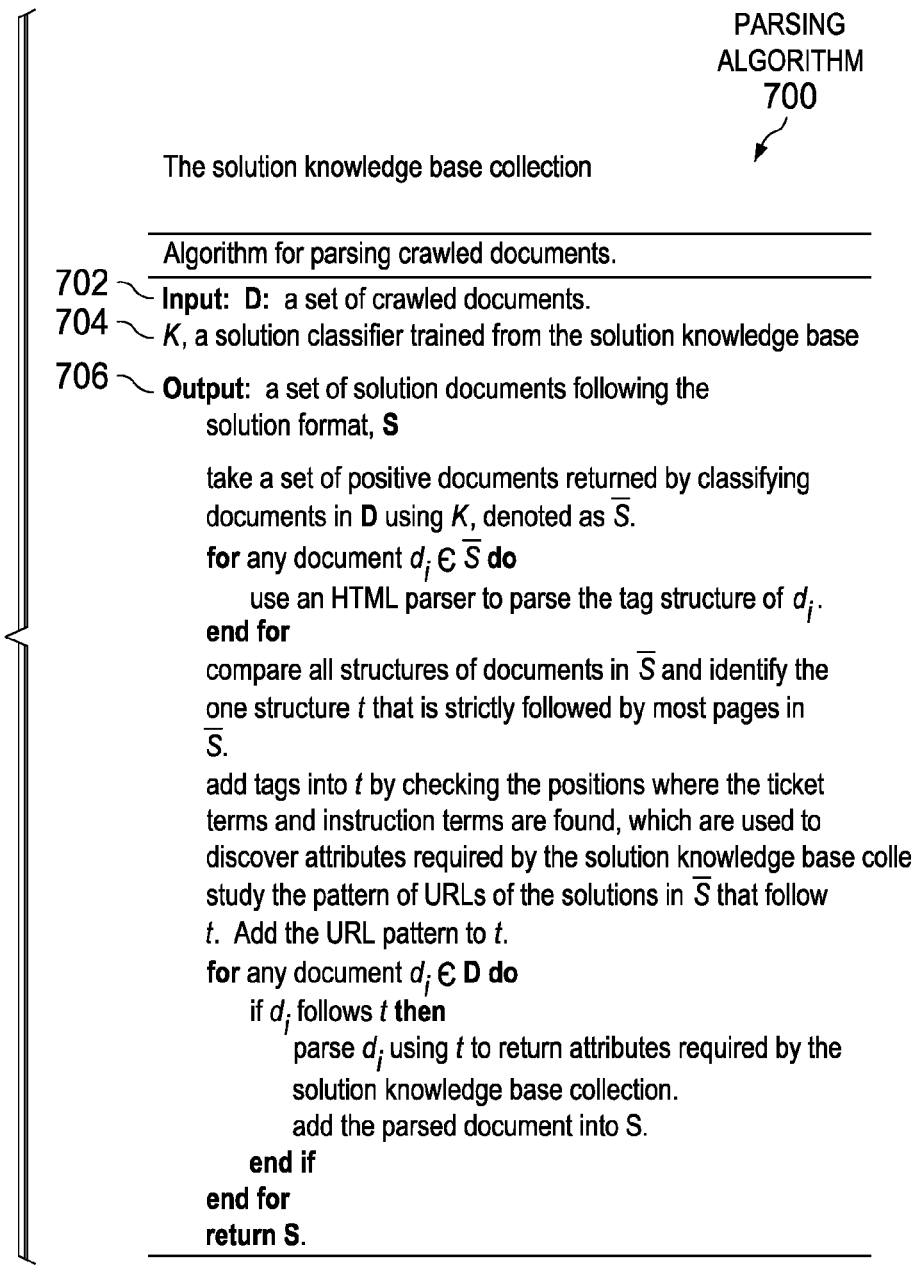
FIG. 7 is an exemplary illustration of a parsing algorithm in accordance with an illustrative embodiment.

With reference now to FIG. 7, an exemplary illustration of a parsing algorithm is depicted in accordance with an illustrative embodiment. Parsing algorithm 700 may, for example, be implemented in a solution mining and building engine, such as solution mining and building engine 302 in FIG. 3. The solution mining and building engine uses parsing algorithm 700 to parse a set of crawled solution documents to generate a set of candidate solution documents, which may be used to solve a problem described in a user query.

Input 702 is a set of crawled documents. The solution mining and building engine trains solution classifier 704 using exemplary solutions in the solution knowledge base collection within the solution database, such as solution database 634 in FIG. 6. Output 706 is a set of solution documents, which follow the structured solution format of the solution knowledge base collection.

The solution mining and building engine takes a set of positive documents returned by classifying documents in the set of crawled documents using the solution document classifier. For each document in the set of positive documents returned, the solution mining and building engine uses an HTML parser to parse the tag structure of the document. In addition, the solution mining and building engine compares all structures of documents in the set of positive documents returned and identifies the one structure that is strictly followed by most documents in the set of positive documents returned. The solution mining and building engine adds tags into the one structure by checking the positions where the ticket terms and instruction terms are found, which are used to discover attributes required by solution knowledge base collection. Further, the solution mining and building engine studies the URL patterns of the solutions in the set of positive documents returned that follow the structure. The solution mining and building engine adds the URL pattern to the structure.

For documents in the set of crawled documents, the solution mining and building engine parses a crawled document using the structure to return attributes required by the solution knowledge base collection if the crawled document follows the structure. The solution mining and building engine then adds the parsed document into the set of solution documents, which follow the format of the solution knowledge base collection.

With reference now to FIG. 8, an exemplary illustration of a scoring algorithm is depicted in accordance with an illustrative embodiment. Scoring algorithm 800 may, for example, be implemented in a solution mining and building engine, such as solution mining and building engine 302 in FIG. 3. The solution mining and building engine uses scoring algorithm 800 to determine a score for the similarity between two instruction implementation paths.

Input 802 is two lists of click-through instruction steps for two different solutions. Scoring algorithm 800 uses threshold 804 to filter out irrelevant steps. Output 806 is a score indicating the similarity between the two different solutions.

The solution mining and building engine uses scoring algorithm 800 to compare the two solution paths after obtaining the two lists of click-through instruction steps for the two solutions. First, scoring algorithm 800 selects one solution and then starts analyzing each click-through instruction step in the solution sequentially. Subsequently, each click-through instruction step in the selected solution is compared with the click-through instruction steps in the other solution to find corresponding steps. Scoring algorithm 800 uses a subroutine to return a textual relevance value for the noun phrases in the candidate click-through instruction steps. If the returned textual relevance value is above a predetermined threshold, then scoring algorithm 800 determines that a hit is found and the textual relevance value is added to the path similarity score. Also, it should be noted that scoring algorithm 800 strictly follows the sequence of actions by maintaining the position of the previously matched instruction step. Similarly, scoring algorithm 800 also determines similarity between critical core instruction steps to recommend solutions based on similarity in their critical core instruction steps.

Figure 9A:
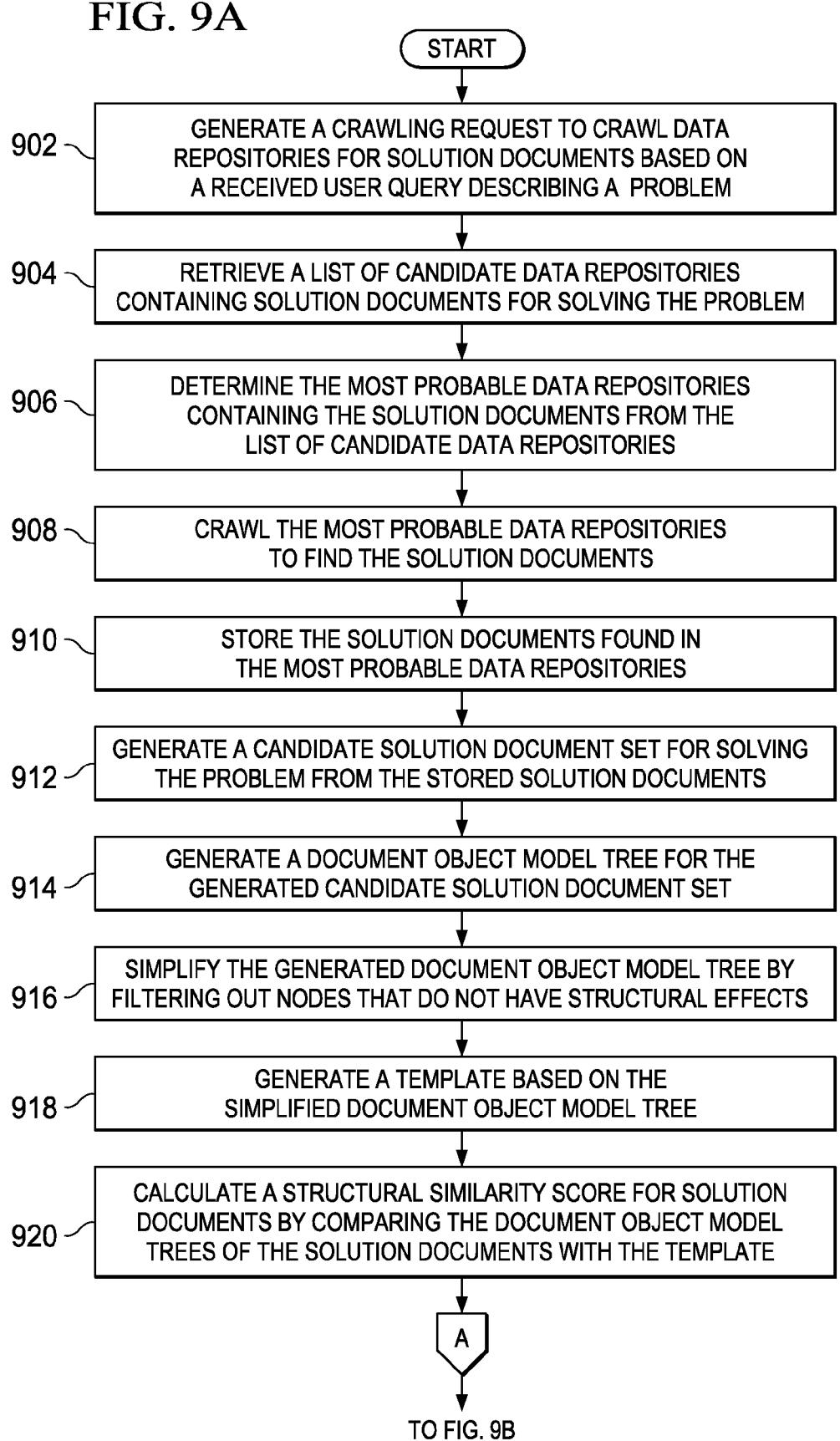
FIG. 9A and FIG. 9B is a flowchart illustrating an exemplary process for automatic acquisition of solution documents in accordance with an illustrative embodiment.
Figure 9B:
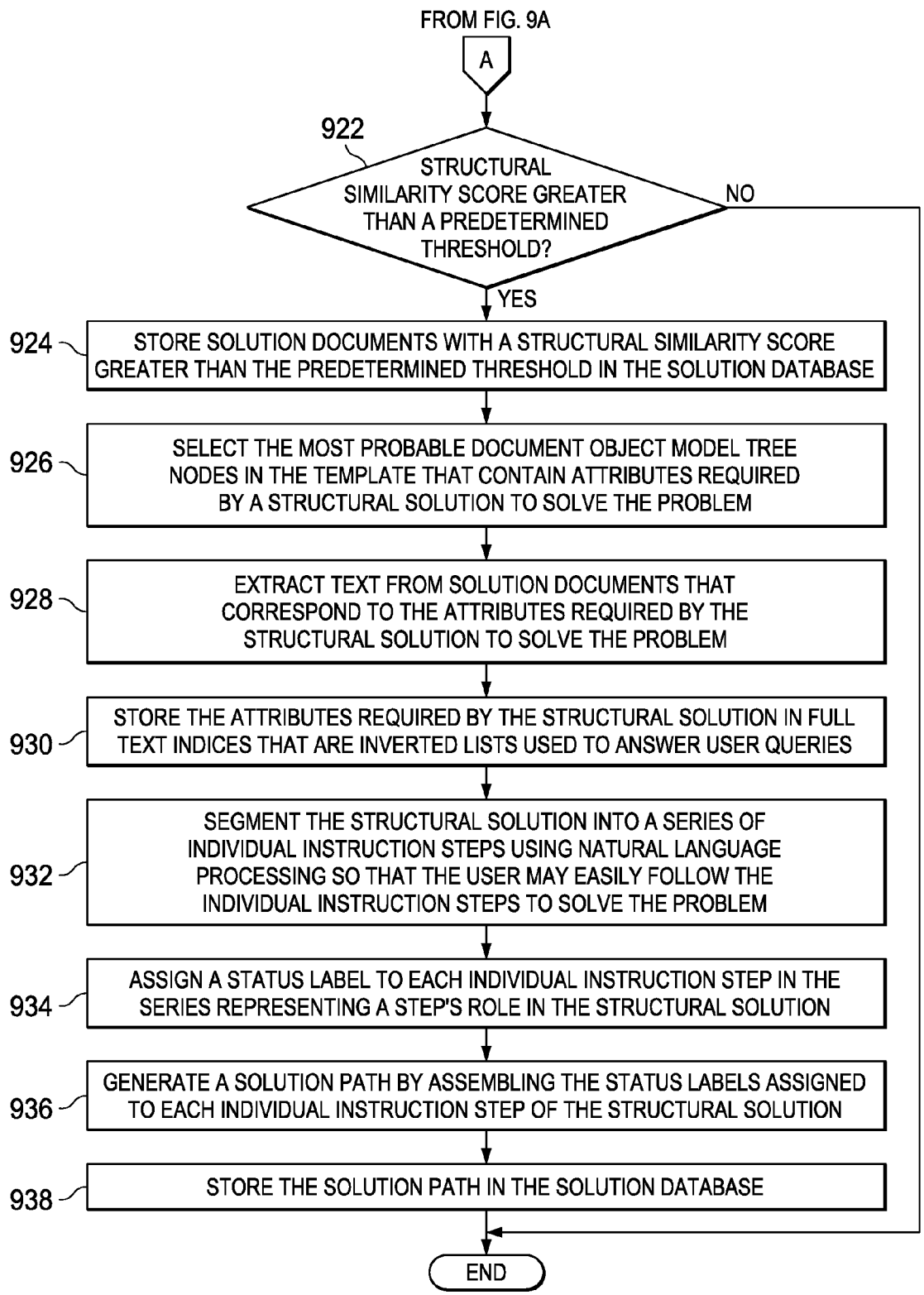

With reference now to FIG. 9A and FIG. 9B, a flowchart illustrating an exemplary process for automatic acquisition of solution documents is shown in accordance with an illustrative embodiment. The process shown in FIGS. 9A-9B may be implemented in a solution mining and building engine, such as solution mining and building engine 218 in FIG. 2.

The process begins when the solution mining and building engine generates a crawling request to crawl data repositories, such as local content 304 and remote content 306 in FIG. 3, for solution documents based on a received user query describing a particular problem, such as a software setting problem (step 902). The solution mining and building engine uses a focused crawler, such as focused crawler 602 in FIG. 6, to crawl the Web, such as Web 630 in FIG. 6, for data repositories containing solution documents. Then, the solution mining and building engine retrieves a list of candidate data repositories containing solution documents for solving the problem (step 904). Afterward, the solution mining and building engine determines the most probable data repositories containing the solution documents from the list of candidate data repositories (step 906).

Subsequently, the solution mining and building engine crawls the most probable data repositories to find the solution documents (step 908). Then, the solution mining and building engine stores the solution documents found in the most probable data repositories (step 910). Afterward, the solution mining and building engine generates a candidate solution document set for solving the problem from the stored solution documents (step 912). In addition, the solution mining and building engine generates a document object model tree for the generated candidate solution document set (step 914).

Subsequently, the solution mining and building engine simplifies the generated document object model tree by filtering out nodes in the tree that do not have structural effects or functionality (step 916). For example, the solution mining and building engine is interested in document object model tree nodes with structural functionalities, such as, for example, <table>, <div>, and <p>. Nodes with visual effects or functionality, such as, for example, <B>, or content delivery, such as, for example, <img>, are insignificant in determining document structures and thus are removed from the document object model tree. Then, the solution mining and building engine generates a template based on the simplified document object model tree (step 918). The solution mining and building engine uses a voting strategy to discover the most probable solution from training documents and takes the most probable solution's simplified document object model tree as the template for a Web site. Specifically, the solution mining and building engine concatenates document object model tree nodes of a solution document into a string and uses the Levenshtein distance between two strings to measure the similarity between two document object model trees. By assuming that most solution documents from a particular Web site follow a uniform structure, the solution mining and building engine selects the most representative solution document from the training set and then uses the solution document's simplified document object model tree as the template. The solution mining and building engine uses this template to prune crawled Web pages that are not solution documents. Afterward, the solution mining and building engine calculates a structural similarity score for solution documents by comparing the document object model trees of the solution documents with the template (step 920). The solution mining and building engine uses the structural similarity score to determine whether a solution document under test is a possible solution to the problem or not by comparing the solution document's document object model tree with the template.

Subsequently, the solution mining and building engine determines whether the calculated structural similarity score is greater than a predetermined threshold (step 922). If the calculated structural similarity score is not greater than the predetermined threshold, no output of step 922, then the process terminates thereafter. If the calculated structural similarity score is greater than the predetermined threshold, yes output of step 922, then the solution mining and building engine stores solution documents from the originally crawled Web page with a structural similarity score greater than the predetermined threshold in the solution database, such as solution database 634 in FIG. 6 (step 924).

In addition, the solution mining and building engine selects the most probable document object model tree nodes in the template that contain attributes, such as, for example, a specific solution document title or specific core instruction steps, required by a structural solution to solve the problem (step 926). Afterward, the solution mining and building engine extracts text from solution documents that correspond to the attributes required by the structural solution to solve the problem (step 928). Then, the solution mining and building engine stores the attributes required by the structured solution in full-text indices, such as full-text indices 636 in FIG. 6, which are inverted lists used to answer user queries (step 930). In other words, the full-text index or inverted index, which is an inside-out flat data structure, is the index structure that the solution mining and building engine uses for answering full-text queries. The solution mining and building engine stores each term observed in a solution document corpus in the full-text index as an entry, which points to a list of associated solution documents.

Subsequently, the solution mining and building segments the structural solution into a series of individual instruction steps using natural language processing so that the user may easily follow the individual instruction steps to solve the problem (step 932). Then, the solution mining and building engine uses a term-based instruction classifier to assign a status label to each individual instruction step in the series representing a step's role, function, or significance in the structural solution (step 934). For recommendation purposes, the solution mining and building engine labels the functionality or role of each individual instruction step, which afterwards constructs a Markov model to describe the probability of status transitions. By analyzing the status labels within solutions, the solution mining and building engine determines the significance of each individual instruction step and measures its importance. The term-based instruction classifier is trained using a supervised learning approach using a training set. Then, the solution mining and building engine uses the term-based instruction classifier to predict the status label of each individual instruction step.

Subsequently, the solution mining and building engine uses a solution path builder, such as path builder 612 in FIG. 6, to generate a solution path by assembling the status labels assigned to each individual instruction step of the structural solution (step 936). By merging the status labels of all instruction steps in a solution, the solution mining and building engine generates a status-transition path for the solution, which is the basis of the recommendation service to the user. Then, the solution mining and building engine stores the solution path generated by the solution path builder in the solution database (step 938). The solution mining and building engine sends stored solution paths to users submitting problem queries as solution recommendations. The process terminates thereafter.

Figure 10:
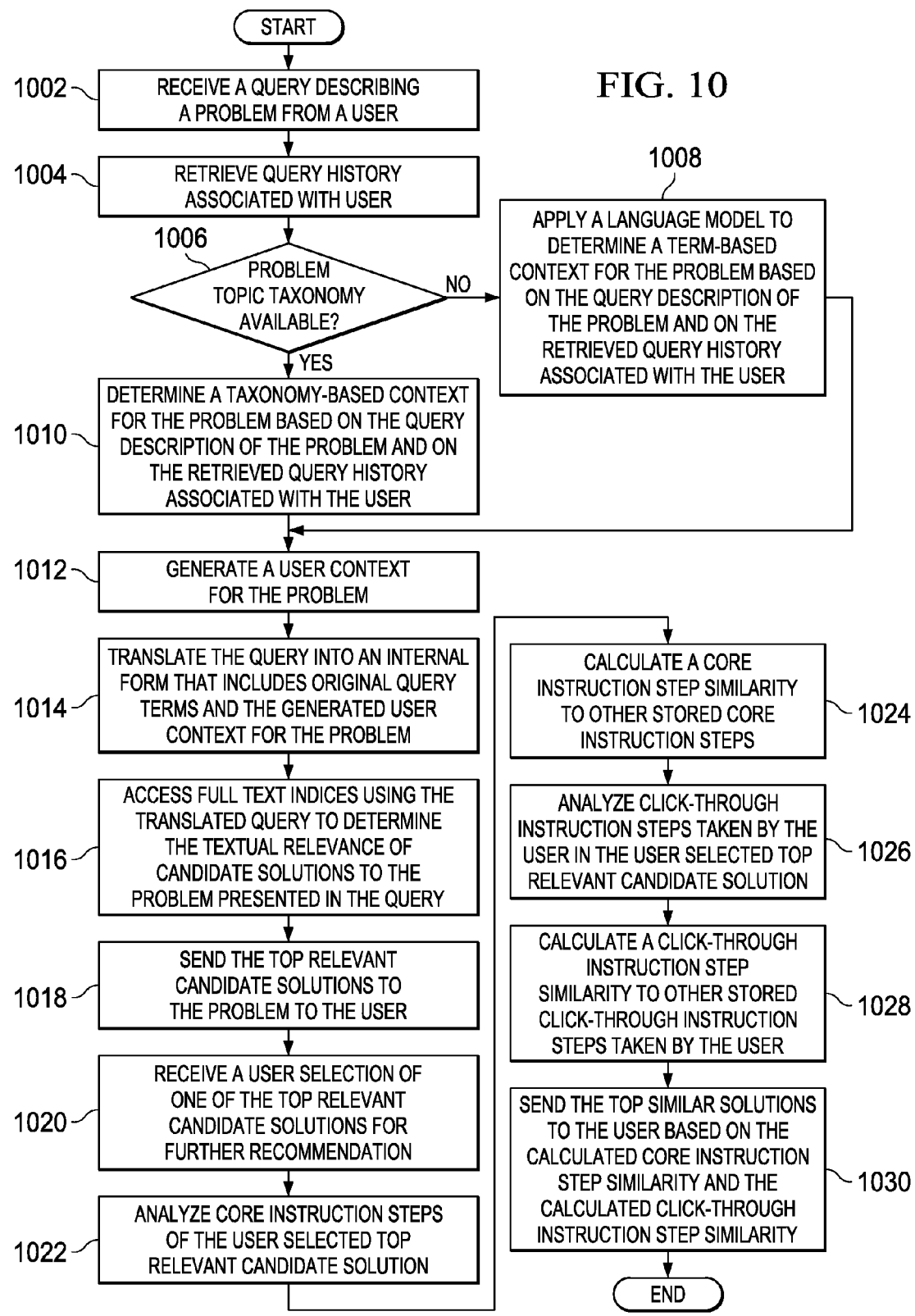
FIG. 10 is a flowchart illustrating an exemplary process for automatic retrieval of solution documents that solve a specific problem in accordance with an illustrative embodiment.

With reference now to FIG. 10, a flowchart illustrating an exemplary process for automatic retrieval of solution documents that solve a specific problem is shown in accordance with an illustrative embodiment. The process shown in FIG.

10 may be implemented in a solution mining and building engine, such as solution mining and building engine 218 in FIG. 2.

The process begins when the solution mining and building engine receives a query describing a particular problem, such as an IT problem, from a user, such as user 640 in FIG. 6 (step 1002). Then, the solution mining and building engine retrieves a query history associated with the user, which includes the user's search and browse history, from a user query history database, such as user query history database 632 in FIG. 6 (step 1004). Afterward, the solution mining and building engine determines whether a problem topic taxonomy, such as problem topic taxonomy 638 in FIG. 6, is available (step 1006). If a problem topic taxonomy is not available, no output of step 1006, then the solution mining and building engine applies a language model to determine a term-based context for the problem based on the query description of the problem and on the retrieved query history associated with the user (step 1008). Thereafter, the process proceeds to step 1012. If a problem topic taxonomy is available, yes output of step 1006, then the solution mining and building engine determines a taxonomy-based context for the problem based on the query description of the problem and on the retrieved query history associated with the user (step 1010).

Subsequently, the solution mining and building engine generates a user context for the problem (step 1012). Afterward, the solution mining and building engine uses a query translator, such as query translator 628 in FIG. 6, to translate the query into an internal form, which includes the original query terms and the associated user context generated for the problem (step 1014). Then, the solution mining and building engine accesses full-text indices, such as full-text indices 636 in FIG. 6, using the translated query to determine the textual relevance of candidate solutions to the problem presented in the query (step 1016). Determining the textual relevance of candidate solutions is necessary in order for a ranking module to rank the candidate solutions. In addition, the ranking module also uses the generated user context associated with the problem to rank the candidate solutions.

Subsequently, the solution mining and building engine sends the top relevant candidate solutions to the problem to the user (step 1018). Afterward, the solution mining and building engine receives a user selection of one of the top relevant candidate solutions for further recommendation (step 1020). Then, the solution mining and building engine uses a core instruction parser, such as core instruction parser 622 in FIG. 6, to analyze the core instruction steps of the user selected top relevant candidate solution (step 1022). Also, the solution mining and building engine uses a similarity calculator, such as similarity calculator 624 in FIG. 6, to calculate a core instruction step similarity to other stored core instruction steps (step 1024). In addition, the solution mining and building engine uses a click-through instruction parser, such as click-through instruction parser 620 in FIG. 6, to analyze the click-through instruction steps taken by the user in the user selected top relevant candidate solution (step 1026). Further, the similarity calculator calculates a click-through instruction step similarity to other stored click-through instruction steps taken by the user (step 1028). Then, the solution mining and building engine sends the top similar solutions to the user based on the calculated core instruction step similarity and the calculated click-through instruction step similarity (step 1030). The process terminates thereafter.

Thus, illustrative embodiments of the present invention provide a computer implemented method, apparatus, and computer program product for automatically retrieving or building solution documents that solve specific IT problems experienced by users. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening privileged or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for retrieving solutions that solve a problem experienced by a user, the computer implemented method comprising:
    generating, by a computer, a candidate solution document set for solving the problem, wherein a customized solution procedure for solving the problem is generated by the computer from a plurality of stored solution documents, and wherein a modified solution procedure with another set of instruction steps is generated by the computer for solving the problem based on the computer receiving an input rejecting one or more instruction steps included in the customized solution procedure;
    generating, by the computer, a document object model tree for the generated candidate solution document set;
    simplifying, by the computer, the generated document object model tree for the generated candidate solution document set by filtering out nodes in the generated document object model tree that do not have structural effects;
    generating, by the computer, a template based on the simplified document object model tree;
    calculating, by the computer, a structural similarity score for solution documents by comparing document object model trees of the solution documents with the generated template;
    determining, by the computer, whether the structural similarity score for the solution documents is greater than a predetermined threshold;
    responsive to the computer determining that the structural similarity score is greater than the predetermined threshold, storing, by the computer, the solution documents with structural similarity scores greater than the predetermined threshold;
    responsive to the computer receiving a query describing the problem, sending, by the computer, relevant candidate solutions to the problem, wherein the relevant candidate solutions include unstructured hypertext markup language solution documents found on a world wide web, and wherein the unstructured hypertext markup language solution documents include solution data found in web logs, instant messaging chat sessions, and online message boards;
    responsive to the computer receiving a selection of one relevant candidate solution from the relevant candidate solutions, analyzing, by the computer, instructions steps within the one relevant candidate solution selected;
    calculating, by the computer, an instruction step similarity between the instruction steps within the one relevant candidate solution selected and other instructions steps within the stored solution documents; and
    sending, by the computer, similar solutions containing similar instruction steps to the instruction steps contained within the one relevant candidate solution selected based on the calculated instruction step similarity.

2. The computer implemented method of claim 1, further comprising:
    responsive to the computer receiving the query describing the problem, retrieving, by the computer, a query history associated with the user;
    determining, by the computer, whether a problem topic taxonomy is available;
    responsive to the computer determining that a problem topic taxonomy is available, determining, by the computer, a taxonomy-based context for the problem based on a description of the problem within the query and the retrieved query history associated with the user;
    generating, by the computer, a context for the problem;
    translating, by the computer, the query into an internal form that includes original terms in the query and the generated context for the problem; and
    accessing, by the computer, full-text indices using the translated query to determine a textual relevance of candidate solutions to the problem.

3. The computer implemented method of claim 2, wherein the query history associated with the user includes a history of problem queries submitted by the user, user search and browse history, and user profile information.

4. The computer implemented method of claim 1, further comprising:
    segmenting, by the computer, a solution into a series of individual instruction steps;
    assigning, by the computer, a label to each of the individual instruction steps in the series that represents an individual instruction step's function within the solution;
    generating, by the computer, a solution path by assembling labels assigned to each of the individual instruction steps within the solution; and
    storing, by the computer, the solution path.

5. The computer implemented method of claim 1, wherein the instruction steps include click-through instruction steps and core instruction steps, and wherein the click-through instruction steps and core instruction steps are labeled for identification.

6. The computer implemented method of claim 5, wherein the core instruction steps are highlighted, and wherein the core instruction steps are action steps that the user follows to solve the problem, and wherein the click-through instruction steps guide the user to the core instruction steps.

7. The computer implemented method of claim 5, wherein in response to determining a current solution the user is browsing, a textual relevance of the core instruction steps of this currently browsed solution is determined in order to recommend other relevant solutions.

8. The computer implemented method of claim 1, wherein metadata is used to determine similarity between solutions.

9. The computer implemented method of claim 1, wherein the customized solution procedure for solving the problem is generated by combining one or more instruction steps selected from a first solution document with one or more other instruction steps selected from a second solution document.

10. The computer implemented method of claim 1, wherein a new solution procedure is generated from the plurality of stored solution documents based on an interactive process with the user during a recommendation process.

11. The computer implemented method of claim 1, wherein the solution data found on the world wide web is analyzed to determine which problems these available solution data solve in order to store and reuse the solution data in a context of solving problems submitted by other users.

12. A computer system for retrieving solutions that solve a problem experienced by a user, the computer system comprising:
a bus system;
a storage device connected to the bus system, wherein the storage device stores a set of instructions; and
a processing unit connected to the bus system, wherein the processing unit executes the set of instructions to generating a candidate solution document set for solving the problem, wherein a customized solution procedure for solving the problem is generated from a plurality of stored solution documents, and wherein a modified solution procedure with another set of instruction steps is generated for solving the problem based on the computer system receiving an input rejecting one or more instruction steps included in the customized solution procedure; generate a document object model tree for the generated candidate solution document set; simplify the generated document object model tree for the generated candidate solution document set by filtering out nodes in the generated document object model tree that do not have structural effects; generate a template based on the simplified document object model tree; calculate a structural similarity score for solution documents by comparing document object model trees of the solution documents with the generated template; determine whether the structural similarity score for the solution documents is greater than a predetermined threshold; store the solution documents with structural similarity scores greater than the predetermined threshold in response to determining that the structural similarity score is greater than the predetermined threshold; send relevant candidate solutions to the problem in response to receiving a query describing the problem, wherein the relevant candidate solutions include unstructured hypertext markup language solution documents found on a world wide web, and wherein the unstructured hypertext markup language solution documents include solution data found in web logs, instant messaging chat sessions, and online message boards; analyze instructions steps within one relevant candidate solution selected in response to receiving a selection of the one relevant candidate solution from the relevant candidate solutions; calculate an instruction step similarity between the instruction steps within the one relevant candidate solution selected and other instructions steps within the stored solution documents; and send similar solutions containing similar instruction steps to the instruction steps contained within the one relevant candidate solution selected based on the calculated instruction step similarity.

13. A computer program product stored on a computer readable storage device having computer usable program code embodied thereon that is executable by a computer for retrieving solutions that solve a problem experienced by a user, the computer program product comprising:
computer usable program code for generating a candidate solution document set for solving the problem, wherein a customized solution procedure for solving the problem is generated from a plurality of stored solution documents, and wherein a modified solution procedure with another set of instruction steps is generated for solving the problem based on the computer receiving an input rejecting one or more instruction steps included in the customized solution procedure;
computer usable program code for generating a document object model tree for the generated candidate solution document set;
computer usable program code for simplifying the generated document object model tree for the generated candidate solution document set by filtering out nodes in the generated document object model tree that do not have structural effects;
computer usable program code for generating a template based on the simplified document object model tree;
computer usable program code for calculating a structural similarity score for solution documents by comparing document object model trees of the solution documents with the generated template;
computer usable program code for determining whether the structural similarity score for the solution documents is greater than a predetermined threshold;
computer usable program code for storing the solution documents with structural similarity scores greater than the predetermined threshold in response to the computer determining that the structural similarity score is greater than the predetermined threshold;
computer usable program code for sending relevant candidate solutions to the problem in response to receiving a query describing the problem, wherein the relevant candidate solutions include unstructured hypertext markup language solution documents found on a world wide web, and wherein the unstructured hypertext markup language solution documents include solution data found in web logs, instant messaging chat sessions, and online message boards;
computer usable program code for analyzing instructions steps within one relevant candidate solution selected in response to receiving a selection of the one relevant candidate solution from the relevant candidate solutions;
computer usable program code for calculating an instruction step similarity between the instruction steps within the one relevant candidate solution selected and other instructions steps within the stored solution documents; and
computer usable program code for sending similar solutions containing similar instruction steps to the instruction steps contained within the one relevant candidate solution selected based on the calculated instruction step similarity.

14. The computer program product of claim 13, further comprising:
- computer usable program code for retrieving a query history associated with the user in response to receiving the query describing the problem;
- computer usable program code for determining whether a problem topic taxonomy is available;
- computer usable program code for determining a taxonomy-based context for the problem based on a description of the problem within the query and the retrieved query history associated with the user in response to determining that a problem topic taxonomy is available;
- computer usable program code for generating a context for the problem;
- computer usable program code for translating the query into an internal form that includes original terms in the query and the generated context for the problem; and
- computer usable program code for accessing full-text indices using the translated query to determine a textual relevance of candidate solutions to the problem.

15. The computer program product of claim 13, further comprising:
- computer usable program code for segmenting a solution into a series of individual instruction steps;
- computer usable program code for assigning a label to each of the individual instruction steps in the series that represents an individual instruction step's function within the solution;
- computer usable program code for generating a solution path by assembling labels assigned to each of the individual instruction steps within the solution; and
- computer usable program code for storing the solution path.

16. The computer program product of claim 13, wherein the instruction steps include click-through instruction steps and core instruction steps, and wherein the click-through instruction steps and core instruction steps are labeled for identification.

17. The computer program product of claim 16, wherein the core instruction steps are highlighted, and wherein the core instruction steps are action steps that the user follows to solve the problem, and wherein the click-through instruction steps guide the user to the core instruction steps.

18. The computer program product of claim 16, wherein in response to determining a current solution the user is browsing, a textual relevance of the core instruction steps of this currently browsed solution is determined in order to recommend other relevant solutions.

19. The computer program product of claim 13, wherein metadata is used to determine similarity between solutions.

20. The computer program product of claim 13, wherein the customized solution procedure for solving the problem is generated by combining one or more instruction steps selected from a first solution document with one or more other instruction steps selected from a second solution document.

* * * * *